J. B. DUNLOP.
WHEEL TIRE FOR CYCLES.
No. 11,153. Reissued Mar. 24, 1891.
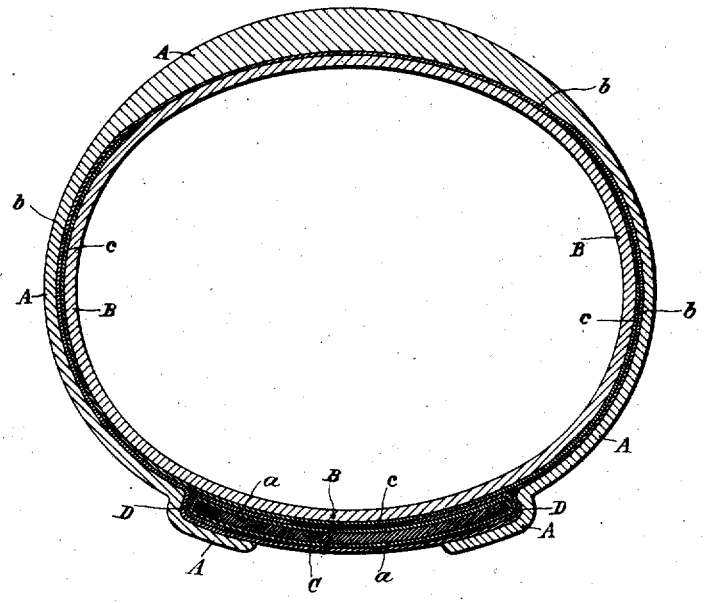
Witnesses:
Raphael Netter
Robt. F. Gaylord
Inventor
John Boyd Dunlop
by Duncan & Page
Attorneys

UNITED STATES PATENT OFFICE.

JOHN BOYD DUNLOP, OF BELFAST, IRELAND.

WHEEL-TIRE FOR CYCLES.

SPECIFICATION forming part of Reissued Letters Patent No. 11,153, dated March 24, 1891.

Original No. 435,995, dated September 9, 1890. Application for reissue filed January 26, 1891. Serial No. 379,186. Patented in England March 8, 1889, No. 4,116.

*To all whom it may concern:*

Be it known that I, JOHN BOYD DUNLOP, of Belfast, Ireland, a subject of the Queen of Great Britain, have invented certain new and useful Improvements in Wheel-Tires for Cycles and other Vehicles and in Means for Securing the Same to the Wheel-Rims, (for which I have obtained a patent in Great Britain, No. 4,116, bearing date March 8, 1889,) of which the following is a specification.

My invention has for its object to provide a hollow or tubular india-rubber tire for the wheels of cycles and other vehicles, which is inflated with air or gas under pressure and surrounded with cloth, canvas, or other suitable material to adapt it to withstand the internal pressure of the within-contained air or gas and to allow of its being maintained securely in position on the rim of the cycle or vehicle wheel.

In order that my invention may be better understood, I have appended the accompanying drawing, the figure there shown illustrating a cross-section, on enlarged scale, of the tire constructed according to my invention.

In carrying out my invention I employ an external covering A, composed of a layer or fold of india-rubber, which is thickened at that portion which comes in contact with the ground. An inner expansible tube B, also of india-rubber, contains the air or gas under pressure.

C is the metallic rim of the wheel, which is somewhat flattened to obtain a large bearing-surface, and enveloped with a protective strip *a* of canvas, cloth, linen, or the like. Strips D, of caoutchouc or other elastic substance, are interposed between the edges of the rim C and the folds or layers *b c*, of canvas or linen, hereinafter more particularly referred to, so as to prevent cutting and abrasion of the tire by the edges of said rim C. A strengthening fold or layer *b* of cloth, linen, or canvas envelops the inner tube B and the rim C, to which latter its edges are cemented or otherwise securely fastened, so as to retain the tire thereon in an efficient manner. To this layer or cloth *b* the inner surface of the external covering A is cemented or otherwise affixed.

*c* is a strip of linen or canvas, the edges of which are cemented to the under surface of the sides or edges of the layer or fold *b* to form an envelope for the expansible tube B. The outer surface of this strip, between the flaps of the layer *b*, is secured as by cement to the concave periphery of the covered rim C.

At any suitable point on the rim of the wheel I provide a non-return valve, which is inserted through an aperture formed for the purpose in the metallic rim C, and protrudes within the inner expansible tube B. The enveloping folds or layers of canvas *b c* effectually resist any undue pressure that may be exerted by the contained air or gas at any particular point, and thus prevent deformation of the tire. The said folds or layers, moreover, serve to effectually maintain the tire in the desired position on the metallic rim C of the wheel.

The tire is made and applied as follows: The rim C is covered with the canvas *a*, the edges being protected by the strips D. The layers *b* and *c* are united to form an envelope around the expansible tube B, and the exterior or exposed portion of layer *c*, between the edges or flaps of *b*, which are left free, is cemented or secured to the covered or protected rim C. The edges or flaps of the layer *b* are then brought over the inner or rounded side of the rim C and cemented or otherwise secured thereto. The outer protective covering A is cemented to the layer *b*, its edges being carried around over the edges of the rim C.

From the foregoing description it will be observed that a hollow air-inflated india-rubber tire constructed according to my invention possesses several important advantages over the solid india-rubber tires at present in use, inasmuch as, while being equal in strength to those ordinarily made, it is more elastic, all vibration and shock when riding or driving over rough roads being intercepted between the rim of the wheel and the ground. Consequently little or no jar is experienced by the rider or riders of the cycle or occupants of the vehicle to which my improvements are applied.

Having now particularly described and ascertained the nature of my said invention and in what manner the same is to be performed, I declare that what I claim is—

1. A wheel-tire for cycles and other vehicles, consisting of a hollow expansible tube, in combination with a non-expansible strengthening and confining cover, of canvas or the like, and an outer or bearing surface of india-rubber, as set forth.

2. A wheel-tire for cycles and other vehicles, consisting of a hollow expansible tube, in combination with a non-expansible strengthening and confining cover, of canvas or the like, and an outer covering of india-rubber thickened at that portion which comes in contact with the ground, as set forth.

3. The combination, with the wheel-tire of a cycle or other vehicle, of an inflated expansible tube, a strengthening and confining cover, of canvas or a like material, enveloping said tube, said cover being formed or provided with edges or flaps enveloping and secured to the inner face of the rim, as set forth.

4. The combination, with the rim of a cycle-wheel and an inflated expansible tubular tire, of a tubular non-expansible confining envelope surrounding the said tire, and formed or provided with flaps or free edges turned over and cemented to the inner face of the rim, as set forth.

5. The combination, with the rim of a cycle-wheel and an inflated expansible tubular tire, of a tubular non-expansible confining envelope surrounding said tire and provided with flaps or free edges secured to the rim, and an outer protective covering of india-rubber, the edges of which are secured to the inner face of the rim, as set forth.

6. The combination, with the rim of a cycle-wheel, of an inflated expansible tubular tire, a strengthening-strip *c*, secured to the periphery of the rim, a strip *b*, of canvas or like material, around the tire and rim, said strip being united to and forming with a strip *c* a non-expansible envelope for the tire, as set forth.

7. The combination, with the rim C, of an inner expansible tube B, and outer protective covering A, and strengthening folds or layers *b c*, of cloth, canvas, or linen, and protective strips D, of caoutchouc, interposed between the edges of the rim and the strengthening fold or layer *c*, as set forth.

JOHN BOYD DUNLOP.

Witnesses:

LAWLENCE J. O'HIGGINS,
6 *Cabra Terrace.*

J. D. HADDOCK,
1 *Emor St., Sth. Circular Road, Dublin.*